US006999444B1

(12) United States Patent
Nitta et al.

(10) Patent No.: US 6,999,444 B1
(45) Date of Patent: Feb. 14, 2006

(54) INTERNET ACCESS SYSTEM AND TELEPHONE DIRECTORY

(76) Inventors: Yoshihiko Nitta, 4-12-10, Higashirinkan, Sagamihara-shi, Kanagawa-ken (JP); Yoshiki Fujimura, 2-16-3, Haramachida, Machida-shi, Tokyo (JP)

( * ) Notice: Subject to any disclaimer, the term of this patent is extended or adjusted under 35 U.S.C. 154(b) by 660 days.

(21) Appl. No.: 09/713,169

(22) Filed: Nov. 15, 2000

(30) Foreign Application Priority Data

Oct. 6, 2000 (JP) ............................ 2000-307874

(51) Int. Cl.
*H04L 12/66* (2006.01)

(52) U.S. Cl. ....................... 370/338; 370/352; 370/474

(58) Field of Classification Search ................ 370/352, 370/474, 357, 389, 338; 345/168; 379/114.01, 379/142.06, 142.01, 142.14, 114; 455/414, 455/566, 415; 709/210, 219, 216, 245, 200; 704/275; 707/1–10
See application file for complete search history.

(56) References Cited

U.S. PATENT DOCUMENTS

| | | | | |
|---|---|---|---|---|
| 5,812,776 | A * | 9/1998 | Gifford | 709/217 |
| 5,813,006 | A * | 9/1998 | Polnerow et al. | 707/10 |
| 5,978,806 | A * | 11/1999 | Lund | 707/10 |
| 6,049,796 | A * | 4/2000 | Siitonen et al. | 707/3 |
| 6,055,305 | A * | 4/2000 | Norman et al. | 379/211.01 |
| 6,137,877 | A * | 10/2000 | Robin et al. | 379/352 |
| 6,141,413 | A * | 10/2000 | Waldner et al. | 379/88.17 |
| 6,247,047 | B1 * | 6/2001 | Wolff | 709/219 |
| 6,438,599 | B1 * | 8/2002 | Chack | 709/229 |
| 6,470,381 | B2 * | 10/2002 | De Boor et al. | 709/217 |
| 6,516,311 | B1 * | 2/2003 | Yacoby et al. | 707/3 |
| 6,574,488 | B2 * | 6/2003 | Oba et al. | 455/566 |
| 6,687,242 | B1 * | 2/2004 | Enzmann et al. | 370/352 |
| 2001/0033564 | A1 * | 10/2001 | Hickman | 370/352 |
| 2002/0065828 | A1 * | 5/2002 | Goodspeed | 707/100 |
| 2003/0088637 | A1 * | 5/2003 | Hatano et al. | 709/216 |

FOREIGN PATENT DOCUMENTS

| | | |
|---|---|---|
| JP | 6-70029 | 11/1994 |
| JP | 9311869 | 12/1997 |
| JP | 11146083 | 5/1999 |
| JP | 11146083 A * | 5/1999 |
| JP | 082074 | 3/2000 |

* cited by examiner

*Primary Examiner*—Chau Nguyen
*Assistant Examiner*—Ian N. Moore
(74) *Attorney, Agent, or Firm*—Volpe and Koenig, P.C.

(57) ABSTRACT

A telephone number sent from a handheld information terminal and identification information produced by adding, to the telephone number, address presence/absence specifying information indicating at least presence/absence of a URL address for identifying a resource on the Internet are acquired. A URL address associated with the identification information is acquired from a telephone number/URL address correspondency database in which at least telephone numbers and Internet domain addresses are associated. A telephone number/URL address correspondency analysis program functions to send the URL address to the handheld information terminal and to prompt the handheld information terminal to access the URL address.

5 Claims, 5 Drawing Sheets

| NAME | TELEPHONE NO. |
|---|---|
| YAMADA TARO | *03-0000-0000 |
| SATO ICHIRO | 03-1020-0001 |
| SUZUKI JIRO | 01-1223-3245 |
| ⋮ | ⋮ |
| YAMADA CORP. | *03-4433-1100 |
| YAMADA CORP. (BUSINESS DIVISION) | *03-4433-1100-001 |
| ⋮ | ⋮ |
| ⋮ | ⋮ |

INTERNET ACCESS SYSTEM AND TELEPHONE DIRECTORY

CROSS-REFERENCE TO RELATED APPLICATIONS

This application is based upon and claims the benefit of priority from the prior Japanese Patent Application No. 2000-307874, filed Oct. 6, 2000, the entire contents of which are incorporated herein by reference.

BACKGROUND OF THE INVENTION

The present invention relates to a convenient Internet access system and a convenient telephone directory.

In the prior art, home pages or mail addresses on the Internet domain are accessed by inputting Internet domain access addresses, or URL (Uniform Resource Locator) addresses, which comprise complex English string code sequences.

When one accesses an information apparatus, a communication apparatus or an information terminal of some company or some party at the other end using the URL address, he/she has to know the domain (URL) name. Even if a directory search engine is used, it is inconvenient to find the domain name unless the genre to which a party at the other end belongs. If one wishes to access a party at the other end on the basis of some particle, etc. without an URL, he/she cannot access it.

BRIEF SUMMARY OF THE INVENTION

The object of the present invention is to provide an Internet access system enabling a user to easily access a specific resource only on the basis of a telephone number, and to provide a telephone directly therefor.

The subject matter of the invention relates to a system for acquiring an Internet domain address by inputting a telephone number, thus accessing an information apparatus, a communication apparatus or an information terminal at the other end.

According to an aspect of the invention, there is provided an Internet access system comprising: an address acquisition section for acquiring a telephone number and identification information produced by adding, to the telephone number, address presence/absence specifying information indicating at least presence/absence of an Internet domain address for identifying a resource on the Internet, and acquiring an Internet domain address associated with the identification information from a database in which at least telephone numbers and Internet domain addresses are associated; and an address transmission section for sending the Internet domain address to a user terminal, and prompting the user terminal to access a resource specified by the Internet domain address.

According to another aspect of the invention, there is provided an Internet access system wherein input data is analyzed to acquire at least one of correspondency information between a telephone number and an Internet domain address associated with the telephone number, correspondency information between a telephone number and attribute information associated with the telephone number, and correspondency information between an Internet domain address and attribute information associated with the Internet domain address.

According to still another aspect of the invention, there is provided a telephone directory comprising: a telephone number display section for associatively displaying a telephone number and discrimination information for discriminating whether there is a URL address associated with the telephone number.

The invention relating the system is applicable to a method using this system.

The invention relating to the system or the method is applicable to a computer-readable recording medium storing a program for enabling a computer to execute a procedure corresponding to the invention (or a program for causing a computer to function as means corresponding to the invention or causing a computer to realize a function corresponding to the invention).

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will now be described with reference to the accompanying drawings.

Figure 1A:
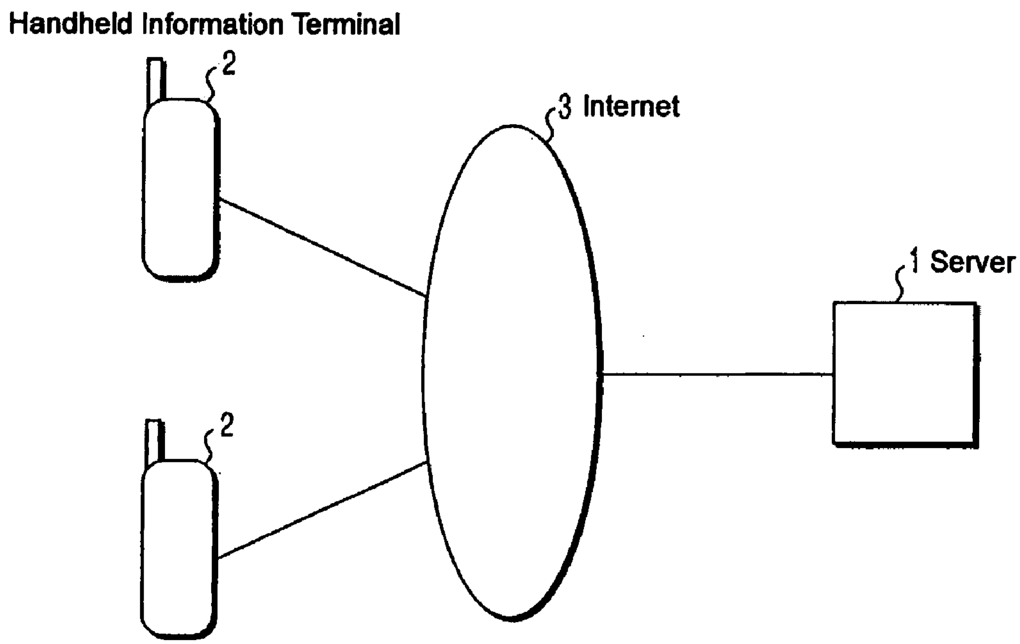
FIG. 1A and FIG. 1B show whole structures of an Internet access system according to one embodiment of the present invention.
Figure 1B:
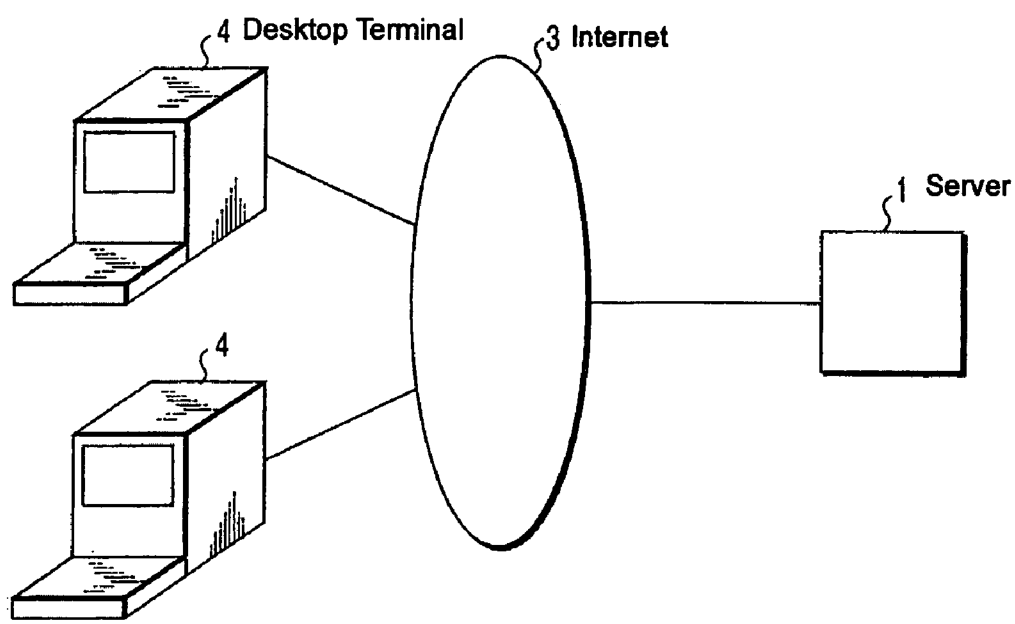

FIGS. 1A and 1B show whole structures of an Internet access system according to one embodiment of the present invention.

As is shown in FIG. 1A, a server 1, which manages the Internet access system, and a plurality of handheld information terminals 2 are connected to the Internet 3. The connection to the Internet 3 may be in a wired mode or a radio (wireless, optical transmission, etc.) mode.

Figure 2:
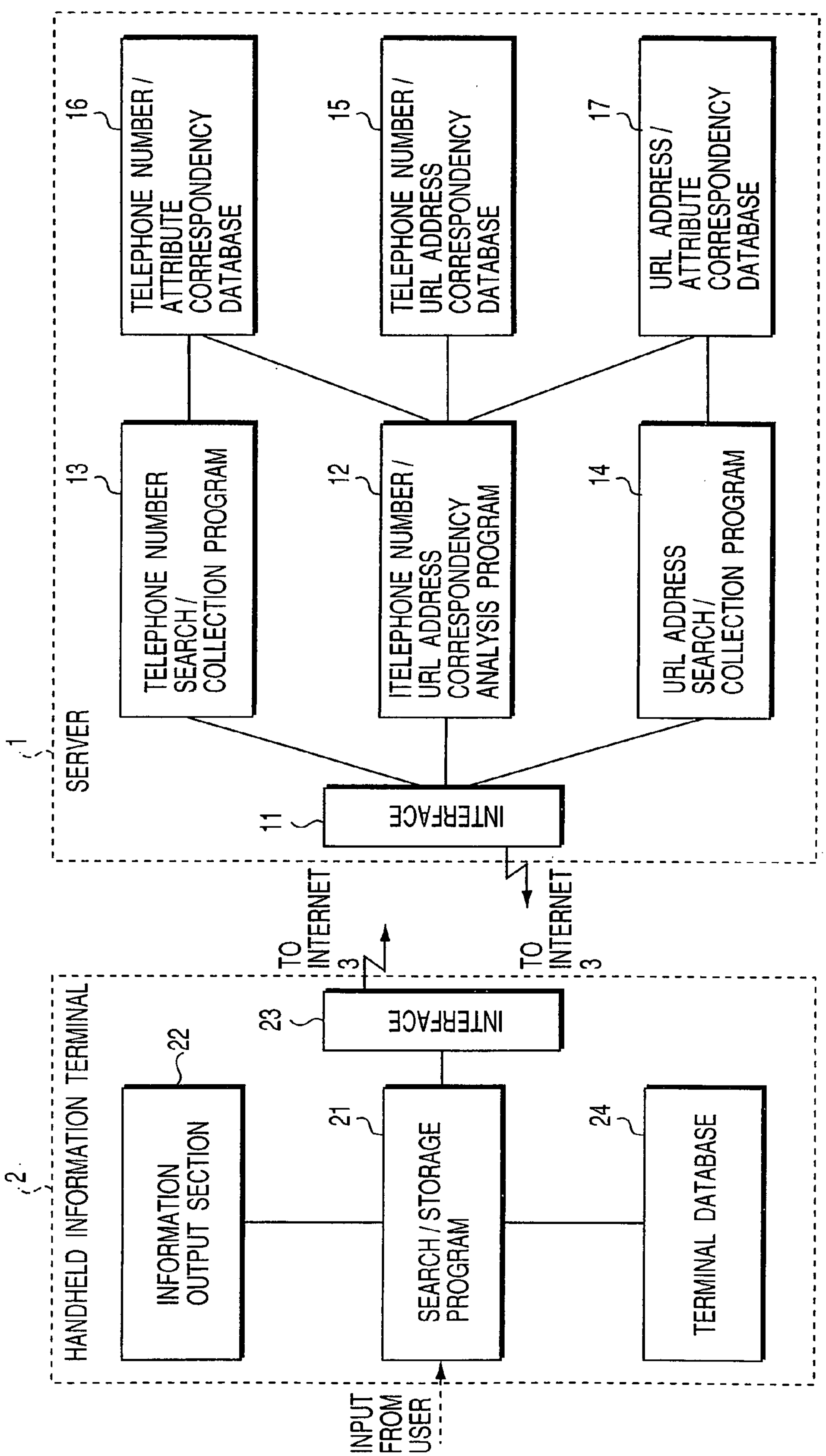
FIG. 2 shows detailed structures of a server and a handheld information terminal according to the embodiment.

FIG. 2 shows detailed structures of the server 1 and handheld information terminal 2. As is shown in FIG. 2, the server 1 has an interface 11 for transmission/reception of information with the Internet 3. A telephone number/URL address correspondency analysis program 12, a telephone number search/collection program 13 and an URL address search/collection program 14 are connected to the interface 11. The telephone number/URL address correspondency analysis program 12 functions to analyze an URL address in response to a request from the handheld information terminal 2. The telephone number search/collection program 13 functions to search and collect a telephone number and attribute information associated with the telephone number from the terminal, etc. connected to the Internet 3. The URL address search/collection program 14 functions to search and collect a URL address and attribute information associated with the URL address from the terminal, etc. connected to the Internet 3. The attribute information in this context includes all kinds of attribute information capable of identifying users of telephone numbers, such as the names of persons, companies or organizations, jobs, general concepts of hobbies, interests, fields of study, etc., as well as categories, addresses, places, or temporal information such as time and dates.

A telephone number/attribute correspondency database 16 in which telephone numbers and attribute information are associated and stored is connected to the telephone number search/collection program 13 and the telephone number/URL address correspondency analysis program 12. A telephone number/URL address correspondency database 15 in which telephone numbers and URL addresses are associated and stored is connected to the telephone number/URL address correspondency analysis program 12. A URL address/attribute correspondency database 17 in which URL addresses and attribute information are associated and stored is connected to the telephone number/URL address correspondency analysis program 12 and the URL address search/collection program 14.

The handheld information terminal 2 comprises an interface 23 for transmission/reception of information with the Internet 3, a terminal database 24, a search/storage program 21 and an information output section 22. The terminal database 24 stores information input by the user, information sent from the server 1, and information processed by the search/storage program 21. The search/storage program 21 is connected to the terminal database 24 and functions to store various information in the terminal database 24 and to request an access, via the Internet 3, to other terminals including the server 1 connected to the Internet 3. The information output section 22 is connected to the search/storage program 21. The information output section 22 displays information sent from the server 1, information input by the user, and various information processed by the search/storage program 21. The information output section 22 may output character information or voice information. Accordingly, voice information or character information may be input to input means (not shown) of the handheld information terminal 2.

Methods of constructing the databases 15 to 17 in the server 1 will now be described.

To begin with, the method of constructing the telephone number/attribute correspondency database 16 will be described.

On the basis of attribute information relating to a given person or company (hereinafter referred to as "to-be-registered party"), the telephone number search/collection program 13 searches countless terminals, etc. connected to the Internet 3 and finds telephone numbers associated with the attribute information. For example, if a search is carried out on the basis of the attribute information of a person A (assuming that the attribute information is the name of person A) using ordinary search engines, WEB (World Wide Web) pages on which the name of person A appears can be extracted. Then, the telephone number of the person A is found from among the extracted WEB pages. A WEB page contains a plurality of character information units. Based on the number of numerals constituting a telephone number, telephone number candidates can be extracted from the character information units. Specifically, if the telephone number comprises 10 numerals, character information units each having 10 successive numerals are extracted. Of course, since there may be character information units including hyphens "-" among numerals indicating telephone numbers, it is preferable to extract such character information units, too. Moreover, the telephone number search/collection program 13 determines whether the extracted telephone number relates to the person A. Where contents of WEB pages, e.g. tags expressed in XML (extensible Markup Language) format, are successively searched, if there is information indicative of a telephone number and the name of person A in a tag set, it is determined that this telephone number identifies person A. Needless to say, the concept of "tag set" includes not only a single tag indicative of one attribute but also a set of tags which are separate but indicative one attribute.

The method of constructing the URL address/attribute correspondency database 17 is basically similar to that of constructing the telephone number/attribute correspondency database 16, except that the telephone number is replaced with an URL address. The database 17 is constructed by the URL address search/collection program 14. Of course, since the URL address of a WEB page containing attribute information can be distinguished from other information, there is no need to perform such a procedure, as described above, for extracting a telephone number on the basis of the number of numerals.

In the above-described methods of constructing the telephone number/attribute correspondency database 16 and URL address/attribute correspondency database URL 17, where the search/collection programs 13 and 14 cannot determine whether the attribute information contained in the WEB page relates to the telephone number of URL address of person A but the WEB page contains such a telephone number of URL address, the operator may display the WEB page (not shown) and check the display content. In this case, since the attribute information of person A can be displayed so as to be distinguishable from other information, the operator can easily find the attribute information of person A.

The method of constructing the telephone number/URL address correspondency database 15 will now be described. At least three methods are available in constructing the telephone number/URL address correspondency database 15.

A first method is used where either the URL address or the telephone number of the to-be-registered party is given in advance. Specifically, one of the URL address and the telephone number, which is not given in advance but is to be found, is extracted from countless WEB pages accessible via the Internet 3. This method is substantially the same as the method of constructing the telephone number/attribute correspondency database 16 or URL address/attribute correspondency database 17.

In a second method, common attribute information between the telephone number/attribute correspondency database 16 and URL address/attribute correspondency database 17 is extracted. The telephone number and URL address associated with the common attribute information are acquired, and the acquired results are registered in the telephone number/URL address correspondency database 15.

In a third method, registration is effected by the input from the user. Specifically, if the user inputs through the handheld information terminal 2 the telephone number and URL address relating to the to-be-registered party having some attribute information, the input information is directly registered in the telephone number/URL address correspondency database 15.

Where the registration is performed by the third method, the user can request registration with plural URL addresses associated. For example, the URL address of the headquarters of some company and the URL address of a branch office of this company may be associated in the registration (hereinafter such associatively registered plural URL addresses are referred to as "URL address set"). In this case, in addition, the telephone number may be associated in accordance with the hierarchical order of URL addresses. That is, the top page of the URL address may be associated with a given page accessible from this top page. For example, where the URL address "http://www.ir.ct.com" of a certain top page is associated with the telephone number "03-3000-0000" in registration, the URL address "http://www.ir.ct.com/es" which is lower in order than the URL address of the top page may be associated with the telephone number "03-3000-0000-001" which is formed by adding information "001" indicative of a lower-order URL address to the end of the telephone number "03-3000-0000".

An Internet access method using the thus constructed databases 15 to 17 will now be described with reference to a flow chart of FIG. 3.

Figure 4A:
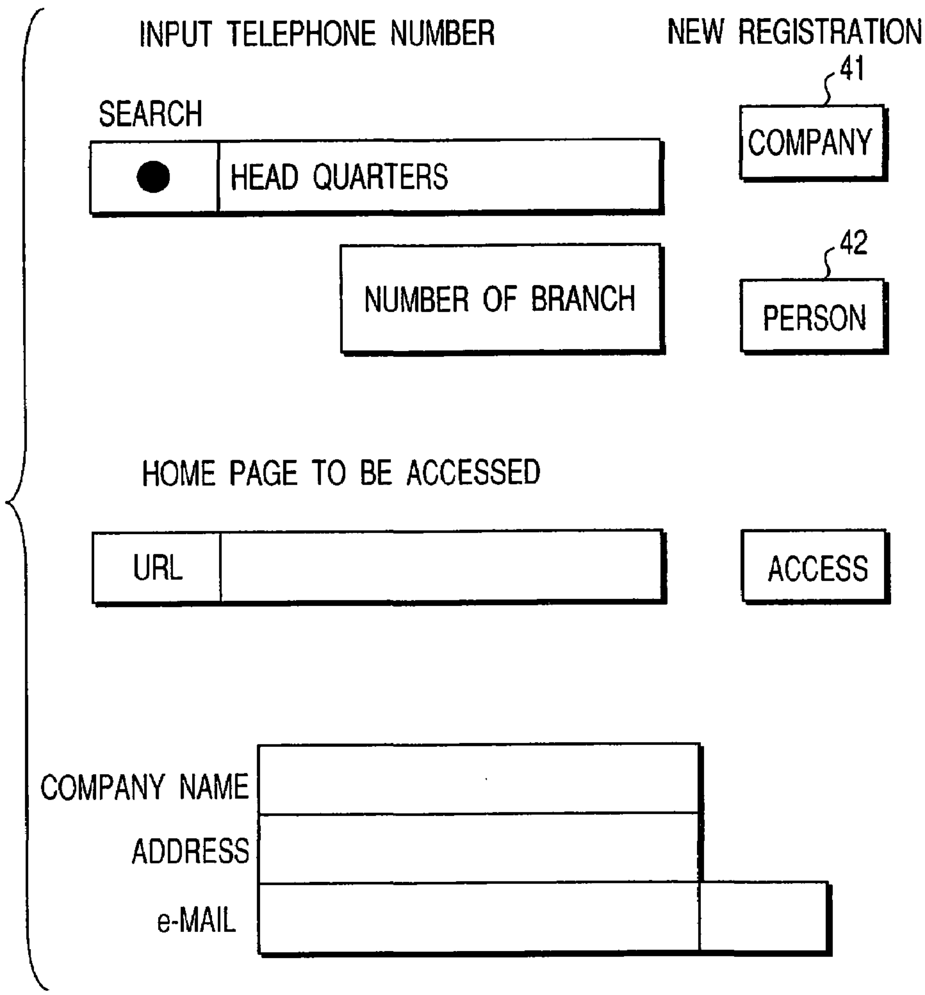
FIG. 4A shows an example of display on an URL address select screen according to the embodiment.

The user accesses the Internet 3, using the handheld information terminal 2, and requests access to the server 1 which manages the Internet access system of the present invention (s1). Upon receiving the request, the server 1 causes the information output section 22 of handheld information terminal 2 to display a telephone number input screen, thus prompting input of the telephone number (s2). The user inputs the telephone number relating to, e.g. the desired access, through the displayed input screen. As regards the method of input, numerical characters may be input one by one, or the terminal database 24 may be searched to extract the already registered telephone number. The thus input telephone number is sent to the server 1 (s3). The telephone number/URL address correspondency analysis program 12 extracts, from the telephone number/URL address correspondency database 15, the URL address set consisting of plural URL addresses including the URL address associated with the received telephone number (s4). The URL address select screen including the URL address set is displayed (s5). FIG. 4A shows an example of display on the URL address select screen. The user confirms the display on the information output section 22 of handheld information terminal 2 and selects the desired URL address. The operation for selection may be freely selective. For example, the cursor is moved on the screen displayed on the information output section 22, using the input means (not shown) provided on the handheld information terminal 2, and presses a decision button when the cursor has reached the desired URL address. For example, new registration buttons 41 and 42 may be provided using the URL address select screen, and new registration of a company or a person may be prompted. The information selected by the user is sent to the server 1 (s6). The telephone number/URL address correspondency analysis program 12 extracts the URL address associated with the obtained select information from the database 15, sends the URL address to the handheld information terminal 2 and causes the information output section 2 to display a confirmation screen including this URL address (s7). The confirmation screen may be the same as the URL address select screen shown in FIG. 4A. In this case, a URL address display section and an access request button may be provided on the URL address select screen. The user views the confirmation screen displayed on the information output section 2 and determines whether the displayed URL address is the desired URL address. If it is the desired address, an access request button, for instance, is pressed to output to the search/storage program 21 URL specifying information which specifies the determined URL address. The search/storage program 21 requests access to the URL address specified by the URL specifying information (s8). With the access request, a desired resource (e.g. a desired terminal) indicated by the desired URL address can be accessed.

Figures 5, 6:
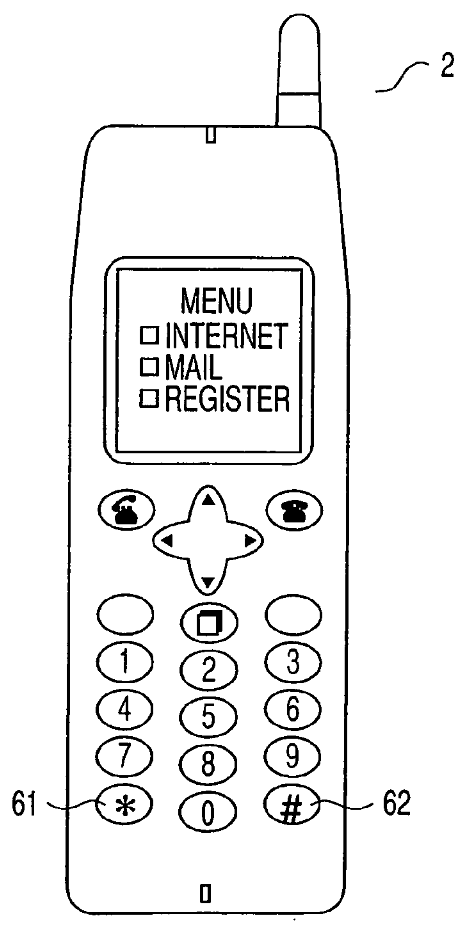
FIG. 5 shows an example of a displayed telephone number list of a telephone directory in a case of using the Internet access system according to the embodiment.
FIG. 6 shows an example of the handheld information terminal according to the embodiment.

FIG. 5 shows an example of a telephone number display list of a telephone directory in a case where the Internet access system with the above structure is used. Where the system is constructed as described above, it is easily understood, as is shown in FIG. 5, that a telephone number with identification information "*" at the top thereof, among telephone numbers listed in the telephone directory, is not merely a telephone number for requesting a call, but a telephone number associated with an URL address. Moreover, the identification information "*" actually indicates an URL address which can be accessed by inputting the telephone number with this identification information. Accordingly, this telephone directory has both the function of a telephone directory listing telephone numbers and the function of a URL address list. As a result, there is no need to prepare a URL address directory in addition to a telephone directory. Of course, for editors of telephone number directories, there is no need to provide a URL address column to the telephone directory, or a list for URL addresses. By adding the identification information "*" to the currently available telephone directory, this telephone directory may be sold as an URL address directory. Needless to say, such a telephone directory may be printed on paper or displayed on information display means such as a CRT of a computer.

As has been described above, according to the embodiment of the invention, the user can access a desired resource (e.g. a desired terminal) without inputting a URL address, which is troublesome and time-consuming. Furthermore, since the already available telephone number is used as the identification information for identifying the party to be called, the identification information for identifying the party to be accessed can be acquired without producing identification information independently in addition to the already available identification information. It should suffice if digital identification information indicating whether there is registration of URL address is newly added to the already available information. Even a user who does not know a certain URL address itself can search for the URL address by the programs 12 to 14 on the basis of attribute information specifying a resource to be accessed, only if he/she knows such attribute information. Thus, the user can access the desired resource on the basis of the attribute information alone. In a case of a terminal in which software for inputting Chinese characters is not installed, an Internet domain address including a Chinese character cannot be input. However, according to the present invention, there arises no problem if symbol "*" can be input as identification information, other than numerals or Chinese characters. Thus, it is not necessary that the terminal be equipped with Chinese character inputting software.

Figure 4B:
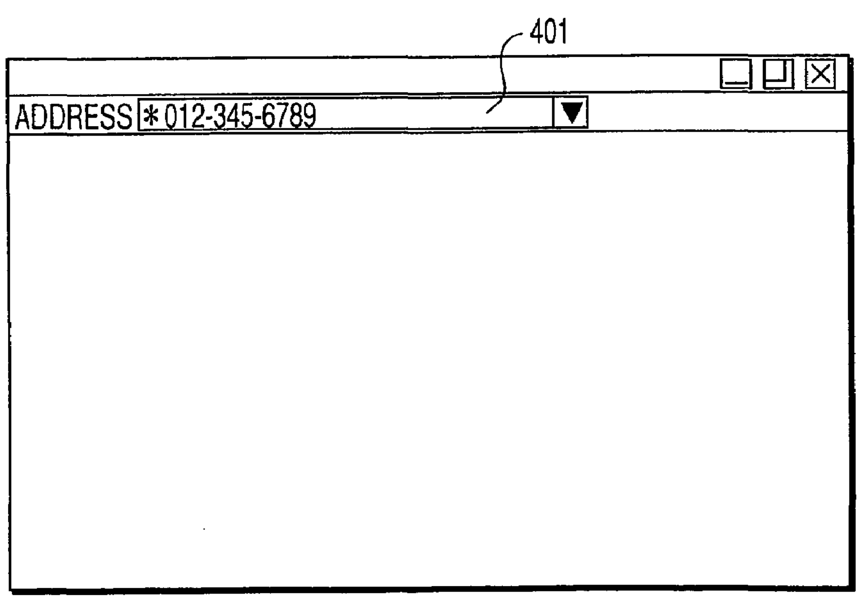
FIG. 4B shows an example of an Internet domain address input screen.

The present invention is not limited to the above embodiment. In the above embodiment, the server 1 and handheld information terminal 2 are employed by way of example. However, as shown in FIG. 1B, the handheld information terminal 2 may be replaced with a desktop terminal 4. In the above embodiment, the URL address is used as the Internet domain address. However, it is possible to use, in addition to the URL address, any resource specifying information (e.g. Internet domain address) for distinguishing one resource from another, which is connected to the network.

Where the present invention is applied to the desktop terminal 4, etc. having a keyboard capable of inputting characters by pressing the associated keys which correspond to alphabet and numerals in one-to-one correspondency, it is possible to input characters to an Internet domain address input section (address bar) on a telephone number input screen. In this case, both the ordinary Internet domain address and the telephone number can be input to the Internet domain address input section. Thus, software for distinguishing addresses and telephone numbers is used. FIG. 4B shows an example of the Internet domain address input screen including an address bar 401. This software performs morphological analysis and/or syntactic analysis of characters input to the address bar 401. Preferably, where the input characters begin with "http", they are determined to indicate an Internet domain address. Otherwise, the input characters are determined to indicate a telephone number. Where the Internet domain address has been input, the software may cause the telephone number/URL address correspondency analysis program 12 to extract, from the telephone number/URL address correspondency database 15, the telephone number associated with the input address, and the obtained telephone number may be displayed on the screen. Thereby, the user can easily ask a question or make a complaint by dialing the obtained telephone number with respect to the resource accessed based on the Internet domain address.

In the case of the desktop terminal 4, it is preferable to input a hyphenated telephone number. For example, telephone number "*0123456789" is input as "*012-345-6789". The telephone number including hyphens "-" is discriminated. However, even whether the terminal employed is the desktop terminal 4 or the handheld information terminal 2, and even whether the telephone number is hyphenated or not, the telephone number should preferably be identified.

The present embodiment is applicable to worldwide telephone numbers. Where the present system is commonly used worldwide, it is possible to add character information, such as alphabet or numerals, to the identification information "*". For example, character information, such as "jpn" for Japan, "usa" for the U.S, or "chn" for China, may be added as country identification information for identifying countries. On the input screen described in connection with step (s2), the input of the telephone number may be prompted and the selection of the country associated with the request for access may also be prompted. In this case, the country associated with the request for access may be selected by selecting image information on national flags displayed on the input screen.

Figure 3:
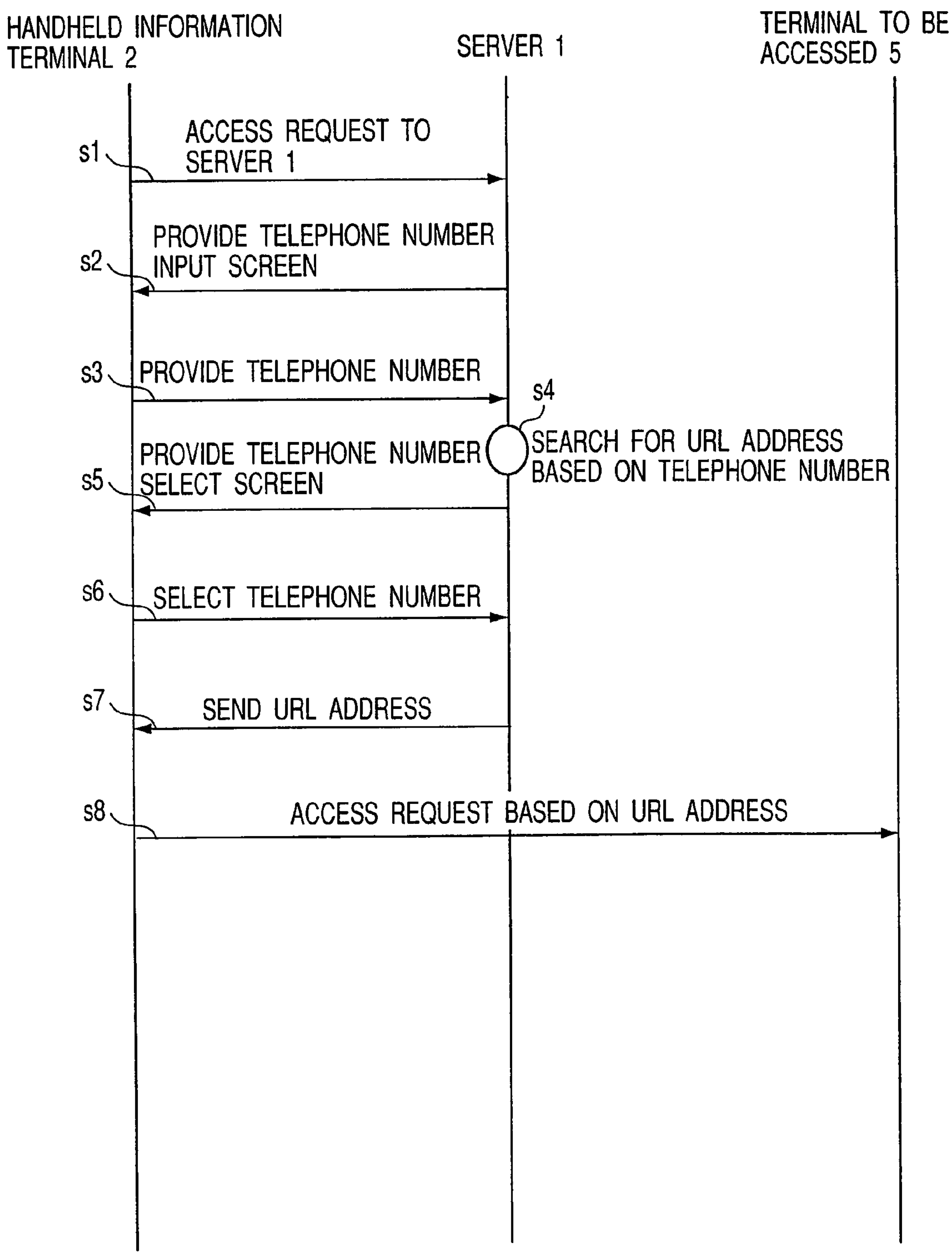
FIG. 3 is a flow chart illustrating an Internet access procedure according to the embodiment.

Although FIG. 3 shows the case of separately inputting and selecting the telephone number, the selection operation may be omitted and the URL address may be sent from the server 1 to the terminal 2 in response to the input of the telephone number. In addition, in the above embodiment, after the telephone number is selected, the URL address is sent and delivered to the information output section 22 of the terminal 2. For example, if the terminal 2 is set such that "http://www." is output on the URL address display section by pressing "*" on the input screen, only the subsequent address may be input and quick access to the desired terminal, etc. is enabled. Besides, the terminal 2 may be set such that "co.jp/" or "co.jp/i/" may be displayed by pressing "#" on the input screen. FIG. 6 shows an example of the handheld information terminal 2 having a "*" button 61 and a "#" button 62. With these settings, the user can access the desired terminal only by inputting "*telephone number#". As a result, the presence of a home page can be emphasized and stressed on the telephone directory, etc. without incurring an excess cost.

In the above embodiment, the URL address and the telephone number for call are distinguished by adding to the telephone number the address presence/absence specifying information "*" indicating that the URL address is associated with the telephone number. Needless to say, this invention is not limited to this embodiment. Other identification information may be added as the address presence/absence specifying information in place of the above information "*". The server 1 may function not only to provide the above WEB page accessing services, but also to provide line connection services between information terminals in response to call requests. In this case, it is desirable to provide, between the interface 11 of server 1 and the programs 12 to 14, discrimination means for discriminating the telephone number for call request and the telephone number for WEB page access. This discrimination means determines whether the telephone number sent from the information terminal includes URL address presence/absence specifying information "*". If it includes the URL address presence/absence specifying information "*", it is determined that the access to the WEB page is requested, and the access connection service is provided by the operation according to the above-described embodiment. If the telephone number sent from the information terminal does not include URL address presence/absence specifying information "*", it is determined that a telephone call is requested, and the line connection for a call between information terminals is effected.

As has been described above in detail, according to the present invention, a resouce (e.g. a desired terminal) can easily be accessed without inputting an Internet domain address, which is troublesome and time-consuming.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An Internet access system comprising:

determination means for determining whether a telephone number and address presence/absence specifying information are added to input data or not, the address presence/absence specifying information indicating presence/absence of an Internet website address for specifying presence/absence of a website on the Internet;

an address acquisition section for acquiring the Internet website address from a database in which the telephone number and the Internet website address are associated, in a case where the determination means determines that the telephone number and the address presence/absence specifying information are added to the input data; and an address sending section for sending the acquired Internet website address;

wherein the determination means effects line connection for communication, in a case where the determination means determines that the address presence/absence specifying information is not added to the input data.

2. An Internet access system according to claim 1, wherein said database is generated by a search section for searching resources connected to the Internet, thereby producing correspondency data between the telephone number and the Internet website address.

3. An Internet access system according to claim 1, wherein said database is generated by searching resources connected to the Internet and finding, on the basis of the telephone number and attribute information associated with the telephone number, the Internet website address associated with the attribute information.

4. An Internet access system according to claim 1, wherein said database is generated by searching resources connected to the Internet and finding, on the basis of the Internet website address and attribute information associated with the Internet website address, the telephone number associated with the attribute information.

5. A method applied to an Internet access system comprising the steps of:

determining whether a telephone number and address presence/absence specifying information are added to input data or not, the address presence/absence specifying information indicating presence/absence of an Internet website address for specifying presence/absence of a website on the Internet;

acquiring the Internet website address from a database in which the telephone number and the Internet website address are associated, in a case where it is determined in the determining step that the telephone number and the address presence/absence specifying information are added to the input data; and sending the acquired Internet website address;

wherein in the determining step, line connection for communication is effected, in a case where it is determined in the determining step that the address presence/absence specifying information is not added to the input data.

* * * * *

UNITED STATES PATENT AND TRADEMARK OFFICE

CERTIFICATE OF CORRECTION

PATENT NO. : 6,999,444 B1
APPLICATION NO. : 09/713169
DATED : February 14, 2006
INVENTOR(S) : Nitta et al.

It is certified that error appears in the above-identified patent and that said Letters Patent is hereby corrected as shown below:

At column 8, line 40 delete “resouce” and insert therefor --“resource”--.

Signed and Sealed this

Thirteenth Day of February, 2007

JON W. DUDAS
*Director of the United States Patent and Trademark Office*